(12) United States Patent
Lahmadi et al.

(10) Patent No.: US 12,393,694 B2
(45) Date of Patent: Aug. 19, 2025

(54) COMPUTER-IMPLEMENTED METHOD FOR TESTING THE CYBERSECURITY OF A TARGET ENVIRONMENT

(71) Applicant: INSTITUT NATIONAL DE RECHERCHE EN INFORMATIQUE ET EN AUTOMATIQUE (INRIA), Le Chesnay (FR)

(72) Inventors: Abdelkader Lahmadi, Le Chesnay (FR); Jérôme Francois, Le Chesnay (FR); Frédéric Beck, Le Chesnay (FR)

(73) Assignee: INSTITUT NATIONAL DE RECHERCHE EN INFORMATIQUE ET EN AUTOMATIQUE (INRIA), Le Chesnay (FR)

( * ) Notice: Subject to any disclaimer, the term of this patent is extended or adjusted under 35 U.S.C. 154(b) by 396 days.

(21) Appl. No.: 18/007,362

(22) PCT Filed: Jul. 28, 2021

(86) PCT No.: PCT/FR2021/051410
§ 371 (c)(1),
(2) Date: Jan. 30, 2023

(87) PCT Pub. No.: WO2022/023671
PCT Pub. Date: Feb. 3, 2022

(65) Prior Publication Data
US 2023/0222223 A1 Jul. 13, 2023

(30) Foreign Application Priority Data
Jul. 31, 2020 (FR) ...................................... 2008218

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS 7,013,395 B1   3/2006   Swiler et al.
9,069,930 B1   6/2015   Hart
(Continued)

FOREIGN PATENT DOCUMENTS

WO   2007143226 A2   12/2007
WO   WO-2010042979 A1 *  4/2010 ......... H04L 63/1433

OTHER PUBLICATIONS

International Search Report dated Nov. 16, 2021 for corresponding International Application No. PCT/FR2021/051410, filed Jul. 28, 2021.
(Continued)

*Primary Examiner* — Fatoumata Traore
(74) *Attorney, Agent, or Firm* — David D. Brush; Westman, Champlin & Koehler, P.A.

(57) ABSTRACT

A computer-implemented method for testing cybersecurity of a target environment. The method includes: receiving data from the target environment, the data including software elements; accessing a database of vulnerabilities, and extracting therefrom a list of vulnerabilities including all of the vulnerabilities associated with an element; and building a list of vulnerability chains on the basis of the list of vulnerabilities. The building includes: for each given vulnerability in the list of vulnerabilities, comparing consequences of the current vulnerability with the means of the given vulnerability; when a similarity is found, defining one or more new chains by adding the given vulnerability to each of the chains in the current list, adding the new chain(s) to (Continued)

the list of vulnerability chains, and repealing the receiving and the accessing with the given vulnerability as the current vulnerability, and the list of vulnerability chains as the current list.

9 Claims, 2 Drawing Sheets

(56) References Cited

U.S. PATENT DOCUMENTS

| | | | | |
|---|---|---|---|---|
| 10,114,954 B1* | 10/2018 | Bellis | .................... | G06F 21/577 |
| 2014/0189873 A1* | 7/2014 | Elder | ................. | H04L 63/1433 |
| | | | | 726/25 |
| 2023/0185921 A1* | 6/2023 | Karas | .................... | G06F 21/577 |
| | | | | 726/25 |

OTHER PUBLICATIONS

Written Opinion of the International Searching Authority dated Nov. 16, 2021 for corresponding International Application No. PCT/FR2021/051410, filed Jul. 28, 2021.

Lin Zhaowen et al., "Real-Time Intrusion Alert Correlation System Based on Prerequisites and Consequence", Wireless Communications Networking and Mobile Computing (WICOM), 2010 6th International Conference on, IEEE, Piscataway, NJ, USA, Sep. 23, 2010 (Sep. 23, 2010), p. 1-5, XP031828348.

French Search Report and Written Opinion dated Apr. 26, 2021 for corresponding French Application No. 2008218, filed Jul. 31, 2020.

Sheyner et al., "Automated generation and analysis of attack graphs", In Proceedings of the 2002 IEEE Symposium on Security and Privacy, SP '02, pp. 273-, Washington, DC, USA, 2002.

* cited by examiner

[Fig. 1]
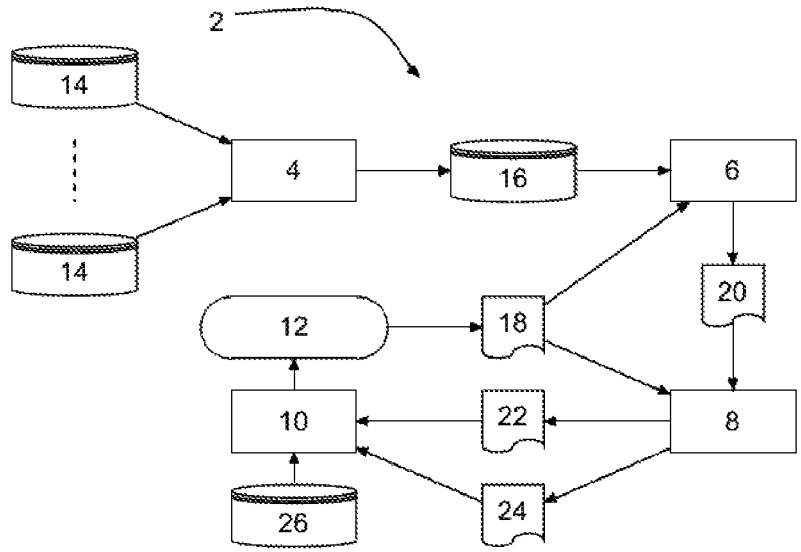
[Fig. 2]
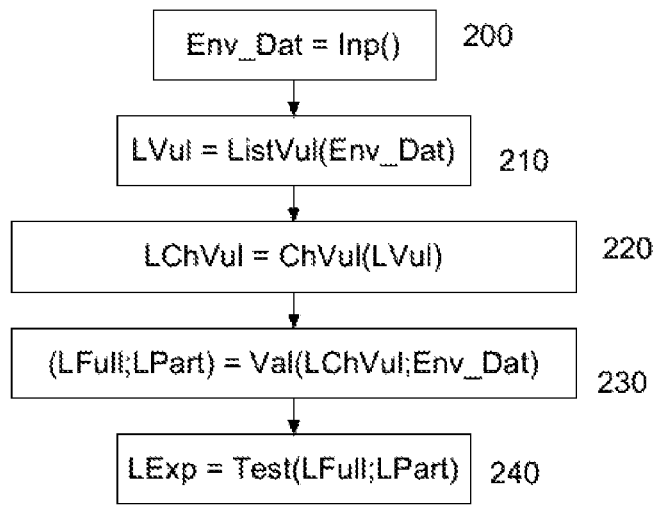
[Fig. 3]
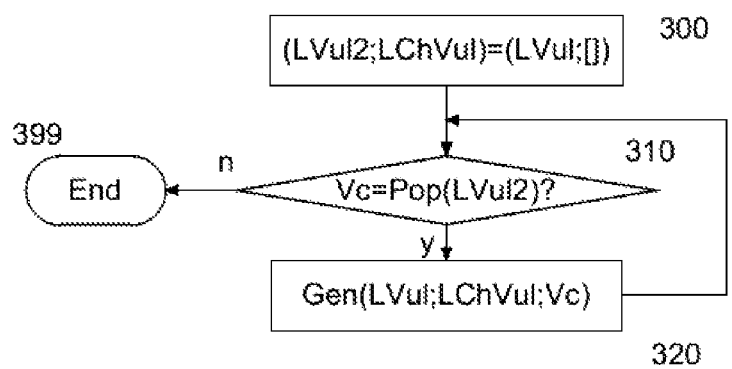

[Fig. 4]
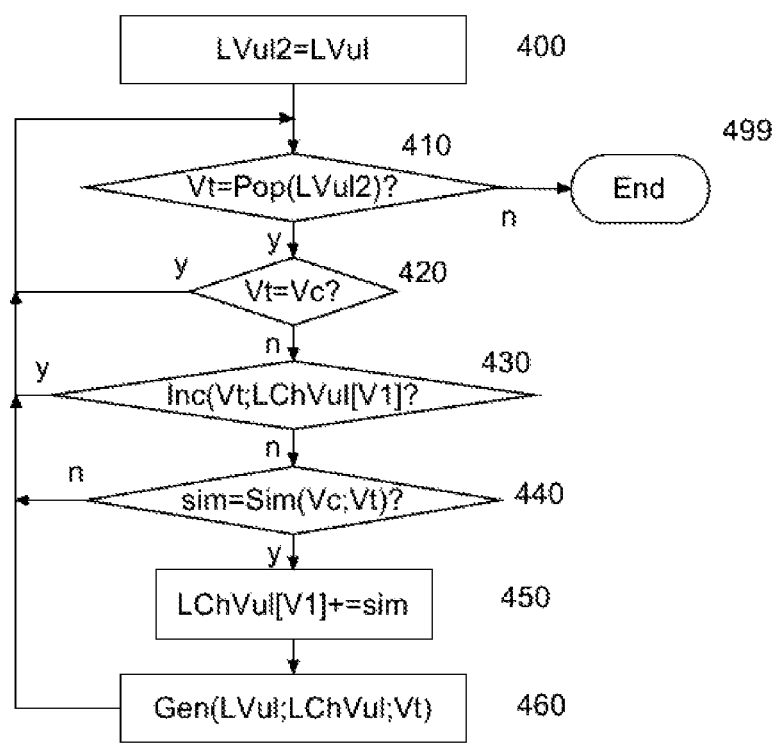

COMPUTER-IMPLEMENTED METHOD FOR TESTING THE CYBERSECURITY OF A TARGET ENVIRONMENT

CROSS-REFERENCE TO RELATED APPLICATION

This Application is a Section 371 National Stage Application of International Application No. PCT/FR2021/051410, filed Jul. 28, 2021, which is incorporated by reference in its entirety and published as WO 2022/023671 A1 on Feb. 3, 2022, not in English.

FIELD OF THE DISCLOSURE

The invention relates to the field of cybersecurity.

BACKGROUND OF THE DISCLOSURE

In the cybersecurity industry, there are various commercial or open source tools, techniques and methods for the passive or active discovery of vulnerabilities. This includes simple so-called "fuzzing" tools (injection of random data into software), penetration testing programs ("pentesting") like the "bug bounty" campaigns carried out by ethical hackers, up to tools capable of automatically identifying vulnerabilities in a target.

These tools and analyses produce security documents in a structured or unstructured format, which briefly or extensively describe security problems, in particular vulnerabilities and their operating modes.

For example, a security document can describe a vulnerability in a field of an HTTP protocol message, sent by an attacker to a website, developed with a particular software version. This HTTP protocol message also contains a specific attack payload, so that the attacker obtains an elevation of privileges and then becomes an administrator, or has access to the passwords and logins of the users of this site.

Once a vulnerability has been detected and validated, it is generally documented through a description made public and published in a standardised textual format, the CVEs (Common Vulnerabilities and Exposure). However, CVEs are far from being fully standardised, and there are almost as many variants as CVEs, which makes their systematic exploitation impossible. In addition, CVEs are neither the only vulnerability presentation formats, nor the only publication references.

To manage this problem, several academic works have proposed ontologies and annotation models for the analysis of textual descriptions associated with vulnerabilities, such as CVE, CWE, CAPEC descriptions, security bulletins, etc. The used analysis techniques are based on algorithms developed in the field of automatic language processing, to automatically extract from these documents knowledge related to the vulnerability or the attack, such as the version of the software, the target function, the means of attack and its consequence.

These academic works focus primarily on building knowledge graphs to provide assistance to analysts, in particular by specifying ontologies suited to this knowledge field.

For example, the project STUCCO proposes an ontology to structure data originating from intrusion detection systems, network flows, CVEs, etc. This allows gathering data and structuring them with an ontology that links different entities together, such as: software, vulnerability, malware, attacker, etc.

Another example is the University of Maryland Baltimore County (UMBC), which has proposed the ontology UCO dedicated to cybersecurity to structure text documents and standard security structures such as CVE, CAPEC, CPE, CVSS, OpenIOC.

Mention may also be made of the MITRE organisation, which offers the STIX standard (Structured Threat Information eXpression) which allows structuring and unifying sharing of the security information, and provides several extensions to include data from different sources. STIX also allows describing multiple entities to model a threat and describing the generic steps of an attack chain like the Tactics, Techniques and Procedures concept which is based on different entities such as malware, attack pattern, consequences of an attack, etc.

Yet herein again, no ontology is really prevalent, and the information on vulnerabilities are scattered. In the absence of a consistent view of vulnerabilities, and in order to help manage risk prevention, several proposals have been formulated to model the successive actions of the attackers to complete an attack such as attack trees, attack graphs or Petri networks. These models differ according to the choice of the representation (tree, graph, etc.) and the attributes that form it (events, actions, network logs, etc.).

Various patent applications have proposed techniques for the generation of attack graphs and the analysis of vulnerabilities.

Thus, WO2007/143226 A2 describes a method for automatically generating attack graphs, and establishing links between the states of the attack and its prerequisites in terms of vulnerabilities. This method describes only the generation of a prerequisite graph by linking states to the vulnerabilities to establish an attack path on one or more systems. However, it requires complex inputs, and cannot be based on the sole knowledge of descriptions of vulnerabilities and their contexts.

U.S. Pat. No. 7,013,395 B1 also describes a method for generating attack graphs to analyse the risk, but this method focuses exclusively on a graph-based approach where the nodes represent attack states, and the links represent state change following an action by the attacker or a user. For this purpose, it uses at the input structured templates describing the steps of the attacks, as well as configuration files describing the target environments. This is complex and must be revisited with each new environment.

Finally, the article by Sheyner et al. "*Automated generation and analysis of attack graphs*", In Proceedings of the 2002 IEEE Symposium on Security and Privacy, SP '02, pages 273, Washington, DC, USA, 2002. IEEE Computer Society, proposes a method for generating an attack graph using the model checking to find paths in a system of transitions allowing certain properties to be met. This approach also requires at the input a mathematical formalization of the possible states and transitions, in particular by using preconditions. Hence, it is complex and lacks flexibility.

Finally, among the tools for cybersecurity analysis, one could retain the Nessus tool from the tenable company, which allows mapping vulnerabilities and providing scan reports, as well as the tenable.se and tenable.io tools which allow prioritising the vulnerabilities by associating their exploitability scores. In France, the AMBIONICS SECURITY company also has a vulnerability monitoring offer for web applications, which consists in mapping, detecting and exploiting vulnerabilities to assess the security of web applications. The Orange group with its cyberdefense division also offers a SOC (Security Operating Centre) for monitoring vulnerabilities in a managed mode, in particular monitoring and analysis of vulnerabilities.

It arises from the foregoing that cybersecurity is therefore a very fragmented field with a multitude of approaches and solutions that are more or less interconnected. This results in a strong reliance on the operators of these tools, and it is impossible to automate the cybersecurity testing of an environment without making heavy investments. In addition, once an environment has been tested, the slightest change can invalidate the analysis without it being easy to prevent the consequences of such a change.

SUMMARY

The invention improves the situation. To this end, it provides a computer-implemented method for testing the cybersecurity of a target environment, comprising:
- a. Receiving target environment data comprising software elements,
- b. Accessing a database of vulnerabilities, each vulnerability being defined by a tuple associating a vulnerability identifier, a list of means defining the means used to exploit the vulnerability, and a list of consequences defining the consequences for exploiting the vulnerability, and extracting therefrom a list of vulnerabilities comprising all of the vulnerabilities comprising a vulnerability identifier associated with a software element included in the target environment data,
- c. Building a list of vulnerability chains on the basis of the list of vulnerabilities by initialising at least one pair comprising an empty list as the current list and one of the vulnerabilities from the list of vulnerabilities as the current vulnerability, and for each couple, by executing the following operations
  - c. 1. For each given vulnerability of the list of vulnerabilities distinct from the current vulnerability and absent from the tuples in the current list, comparing the consequences of the current vulnerability with the means of the given vulnerability, and,
  - c. 2. Whenever a similarity between a consequence of the list of consequences of the current vulnerability with a means of the list of means of the given vulnerability is found,
    - c.2.i. Defining one or more new chains by adding to each of the chains of the current list whose last tuple includes the current vulnerability a tuple associating the given vulnerability, a similarity identifier, the consequence of the list of consequences of the current vulnerability, and the means of the list of means of the given vulnerability,
    - c.2.ii. Adding the new chain(s) to the list of vulnerability chains,
    - c.2.iii. Repeating the operations a. and b. with the given vulnerability as the current vulnerability, and the list of vulnerability chains as the current list.

This device is particularly advantageous because it allows generating vulnerability chains of a target environment automatically on the basis of the sole description of these components and from a unified database of vulnerabilities. Hence, there is no need for complex formalisation of the environment or attacks: the sole description of the elements that compose it is enough.

According to various embodiments, the invention may present one or more of the following features:

- the operation c. includes the initialisation of as many pairs as there are vulnerabilities in the list of vulnerabilities,
- the operation c.2. comprises the determination of a value of similarity between a consequence of the list of consequences of the current vulnerability and a means of the list of means of the given vulnerability, and the determination of the fact that this value of similarity is strictly greater than a selected threshold,
- the selected threshold is zero,
- when the consequence of the list of consequences of the current vulnerability is identical to the means of the list of means of the given vulnerability, the similarity value is 1,
- the target environment data further comprise software element configuration data and software element relationship data, wherein the tuple defining a vulnerability further comprises a list of context data defining the software context in which the vulnerability can be executed, the method further comprising
  - d. Comparing the lists of context data of the vulnerabilities of each vulnerability chain in the list of vulnerability chains with the configuration data and/or the software element relationship data, and
  - d.1. Storing in a first list the vulnerability chains whose vulnerabilities comprise lists of context data which are all contained in the configuration data and/or the software element relationship data, and
  - d.2. Storing in a second list the vulnerability chains of which only some of the vulnerabilities comprise lists of context data contained in the configuration data and/or the software element relationship data, and
- the method further comprises:
  - e. Obtaining exploits corresponding to the vulnerabilities of the vulnerability chains of the first list and of the second list, implementing the exploit chains of the first list and of the second list with these exploits, and returning the chains while classifying them according to whether they belong to the first list or the second list and according to the success rate of their implementation.

The invention also relates to a computer program comprising instructions for executing the method according to the invention, a data storage medium on which this computer program is recorded and a computer system comprising a processor coupled to a memory on which this computer program is recorded.

BRIEF DESCRIPTION OF THE DRAWINGS

Other features and advantages of the invention will appear better upon reading the following description, taken from examples given for illustrative and non-limiting purposes, taken from the drawings wherein:

FIG. 1 represents a generic diagram of a system according to the invention,

FIG. 2 represents a generic diagram of the functions implemented by the system of FIG. 1, FIG. 3 represents an example of implementation of a function of FIG. 2, [chain generation], and FIG. 4 represents an example of implementation of a function of FIG. 3, [recurrent function].

DETAILED DESCRIPTION OF ILLUSTRATIVE EMBODIMENTS

The drawings and the description hereinafter contain essentially certain elements. Hence, they can not only be used to better understand the present invention, but also contribute to the definition thereof, where necessary.

The present description could involve elements that might be subject to protection by author's rights and/or copyright. The rights holder has no objection to the identical replication by anyone of the present patent document or its description, as it appears in the official files. For the rest, he fully reserves his rights.

FIG. 1 represents a generic diagram of a system according to the invention.

As one could see in this figure, a system 2 according to the invention comprises a unifier 4, an extractor 6, a validator 8 and a tester 10 of a target environment 12.

In the example described herein, the unifier 4 accesses a plurality of sources of descriptions of vulnerabilities 14 to produce a database of vulnerabilities 16. Alternatively, the database of vulnerabilities 16 could be supplied directly, and the unifier 4 omitted.

The unifier 4 can use a conventional or deep learning classification technique, a set of regular expressions or a set of rules to extract the attributes of the vulnerabilities. For this purpose, it takes at the input the description of a vulnerability transformed into a sequence of n tokens $\{t1, t2, \ldots, tn\}$ to produce a set $\{(ti, tj, ek)\}$ such that, for each element of this list of named entities, i an integer selected in the range $[1 \ldots n]$ is the index of the first token of the named entity, j an integer selected in the range $\{1 \ldots n\}$ is the index of the last token of the named entity and ek is a named entity from the list of the aforementioned attributes.

Annotation of the tokens to associate the tokens with their named entity classes can result from a manual work or be carried out by a recurrent neural network of the LSTM (Long Short-Term Memory), GRU (Gated Recurrent Unit) or CNN (Convolutional Neural Network) type, or else by a statistical model of the CRF (Conditional Random Field) type or an HMM (Hidden Markov model), or a combination of these techniques.

A non-limiting embodiment uses a recurrent neural network (RNN) which takes at the input the tokens of the textual description of the vulnerability, then associates with each token a numerical representation in the form of a word embedding vector (embedding). These vectors are used by the neural network to calculate the semantic contexts of each token in the sequence of tokens. Finally, a label (tag) is associated with each token. This label represents both its named entity and its position in this entity, the label B indicating the beginning of the named entity, the label I an intermediate position in the named entity and the label E an end position of the token in the named entity.

The annotations can be completed with steps allowing establishing correspondences between the consequences of vulnerabilities. This data set can be built by a normalisation module or manually by an operator, or automatically by a computer program using a machine learning method, a set of regular expressions or a set of rules. The normalisation module is an operational unit that takes at the input the sequences of means and consequences extracted from the descriptions of vulnerabilities, and produces at the output standardised and semantically equivalent sequences.

For example, the following sequences are normalised to the sequence {code, execution}:
remote code execution
RCE
execute arbitrary code
command execution
run arbitrary code.

A non-limiting embodiment of this module uses a recurrent neural network of the encoder-decoder type based on LSTM or GRU cells. To build a corpus of input sequences that is large enough to feed the encoder of this neural network and improve its predictions, the following operations can be applied on the input sequences of the encoder:
Replacement by a synonym: replace a random word selected in a sequence by a synonym,
Permutation of words of the sequence: generate permutations of words of a sequence,
Deletion of a word: randomly select a word and delete it from the sequence.

The encoder block allows encoding in a hidden state a sequence supplied at the input {execute, arbitrary, code}. This hidden state is used by the decoder to predict a sequence of tokens that is semantically equivalent to the sequence supplied at the input.

The equivalences are used to associate the different formulations of the same cause or consequence, or between causes and consequences. The equivalences can be direct or indirect, and thus depend on the context in which they are expressed. Thus, similarity weights or indicators are associated with these equivalences according to their degree of reliability.

For example, the causes improper input despecialisation, improper input verification and improper input validation are equivalent with a very strong similarity and therefore a weight of 0.9. On the other hand, the similarity between the consequences write application data and code injection is lesser, and therefore has a value of only 0.7. It goes without saying that these values are given for illustrative purposes.

This set also contains a set of pre-established causal links, either manually by an operator, or by automatic processing, allowing inferring causes or consequences when these are absent or too abstract in the textual description of the vulnerability. These links are reflected by the statement of properties that enrich those discovered on the target system, but to which a lower probability will be assigned.

For example, if a vulnerability results in the execution of an arbitrary code (code execution), the causes code injection or write file are implied, and therefore stated with a probability of 0.7.

Alternatively, the unifier 4 can access one or more databases of vulnerabilities according to one or more selected ontologies.

The extractor 6 receives software environment data 18 as input and accesses the database of vulnerabilities 16 to produce at the output a list of vulnerability chains 20.

The software environment data includes a list of software configurations (vendor, name, version, etc.) present on a target environment 12. This list can be specified manually by an operator, by a mapping tool or by a computer asset inventory/management tool. These elements allow enriching the context information of a vulnerability, and allow validating the exploitability of an intrusion chain on the target environment 12.

This list of vulnerability chains 20 is supplied with the software environment data 18 to the validator 8. The function of validator 8 is to explore the identified vulnerability chains taking into account the considered software environment. At the output, the validator 8 emits a list of fully validated chains 22 and a list of partially validated chains 24.

Finally, the list of fully validated chains 22 and the list of partially validated chains 24 are supplied to the tester 10, which accesses a database of exploits to implement the chains of these lists. In return, the tester 10 returns a success indicator for each tested vulnerability chain.

In the context of the invention, all data are stored on a memory which may consist of any type of data storage capable of receiving digital data: hard disk, hard disk with a flash memory, flash memory in any form, random-access memory, magnetic disk, distributed storage locally or in the cloud, etc. The data calculated by the device can be stored on any type of memory similar to the memory 4, or on the latter. This data can be erased or kept after the device has performed its tasks. Similarly, the unifier 6, the analyser 8 and the tester 10 are elements directly or indirectly accessing the data. They may be made in the form of appropriate computer code executed on one or more processors. By processors, it should be understood any processor suitable for the calculations described hereinbelow. Such a processor can be made in any known way, in the form of a microprocessor for a personal computer, a dedicated chip of the FPGA or SoC type, a computing resource on a grid or in the cloud, a microcontroller, or any other form capable of providing the computing power necessary for the implementation described hereinbelow. One or more of these elements can also be made in the form of special-purpose electronic circuits such as an ASIC. A combination of a processor and electronic circuits may also be considered.

One will also see that the unifier 6, the analyser 8 and the tester 10 are shown separately to better explain the functions implemented by the system 2. Alternatively, they could be combined in a single unit, split into sub-units, partially grouped together, etc. as long as all of the functions described hereinbelow are carried out.

FIG. 2 represents an example of the functions implemented by the system of FIG. 1.

In a first operation 200, the system 2 executes a function Inp( ) in which the software environment data 18 are input. For example, the function Inp( ) can rely on a user interface through which the location of a file containing the software environment data is designated. Alternatively, these data could be input manually, or determined in part automatically.

Afterwards, in an operation 210, a function ListVul( ) receives as arguments the software environment data 18 and queries the database of vulnerabilities 16. In return, the function ListVul( ) returns a list LVul which contains all of the vulnerabilities likely to affect one or more of the elements of the target environment described by the software environment data 18. At this level, no study of the software context is done, it is just about recovering all of the vulnerabilities that could possibly apply.

Afterwards, the list of vulnerabilities LVul is supplied as an argument to a function ChVul( ) in an operation 220 by the analyser 6. As this will appear with FIGS. 3 and 4, the function ChVul( ) is a recurrent function and an embodiment of which will now be described.

The function ChVul( ) includes a loop that calls a recurrent function while varying its starting point.

Thus, in an operation 300 a local list LVul2 is initialised with the list LVul, and the list of vulnerability chains LChVul is initialised empty. Afterwards, a loop progressively empties the list LVul2 in an operation 310 to define a starting vulnerability Vc, then a recurrent function Gen( ) is executed in an operation 320. This function will be explained with reference to FIG. 4.

When the list LVul2 is empty, it means that all vulnerability chains starting from a vulnerability of the list LVul have been explored and the function ChVul( ) ends in an operation 399.

FIG. 4 represents an example of implementation of the function Gen( ) This function is recurrent in nature, and is intended to browse the list of vulnerabilities LVul, starting from a common vulnerability, to determine whether this common vulnerability could be related to another vulnerability to generate a link in a vulnerability chain. As will be seen, the recurrent nature of the function Gen( ) allows building a vulnerability chain progressively from a starting vulnerability.

The function Gen( ) receives as arguments the list of vulnerabilities LVul, the list of vulnerability chains LChVul and the current vulnerability Vc.

The function Gen( ) starts with an operation 400 in which the list of vulnerabilities LVul is copied into a list LVul2 to browse the list of vulnerabilities other than the current vulnerability.

Afterwards, in an operation 410, the list LVul2 is unstacked to define a vulnerability to be tested Vt. Afterwards, this vulnerability to be tested Vt is subjected to two tests in operations 420 and 430. Indeed, due to the recursive nature of the function, it is important to avoid recurrence loops. For this reason, the operation 420 verifies whether the vulnerability to be tested Vt is identical to the current vulnerability Vc, which would necessarily induce a recurrence loop. Similarly, the operation 430 verifies whether the vulnerability to be tested Vt is already present in the vulnerability chain associated with the current vulnerability Vc in the list of vulnerability chains LChVul. Indeed, this would also induce a recurrence loop.

If one of these tests is positive, then the vulnerability to be tested Vt is ignored and the list LVul2 is unstacked again with the operation 410.

Otherwise, a function Sim( ) receives as arguments the current vulnerability Vc and the vulnerability to be tested Vt in an operation 440 and determines whether the current vulnerability Vc could be exploited to implement the vulnerability to be tested Vt.

In practice, this is done by comparing the consequences of the vulnerability Vc and the means of the vulnerability to be tested Vt. If one of the consequences of the current vulnerability Vc is identical to a means of the vulnerability to be tested Vt, then the function Sim( ) returns a tuple sim which contains the vulnerability to be tested Vt, a similarity identifier indicating the identity link between the consequence(s) of the current vulnerability Vc identical to the means of the vulnerability to be tested Vt, as well as this or these consequences.

If there is no consequence of the current vulnerability Vc identical to a means of the vulnerability to be tested Vt, then the function Sim( ) tests whether one or more consequences of the current vulnerability Vc is similar to a means of the vulnerability to be tested Vt as described hereinabove. Where necessary, the function Sim( ) returns a tuple sim which contains the vulnerability to be tested Vt, a similarity identifier indicating the similarity link (for example the similarity score) between the consequence(s) of the current vulnerability Vc similar to the means of the vulnerability to be tested Vt, as well as this or these consequences.

Otherwise, the returned tuple sim is empty. Finally, the operation 440 includes testing the tuple sim. If the tuple sim is empty, then the vulnerability to be tested Vt is ignored and the list LVul2 is unstacked again with the operation 410.

Otherwise, the vulnerability to be tested Vt is considered as being part of a vulnerability chain for the current vulnerability Vc, and the tuple sim is introduced in the vulnerability chain of the list of vulnerability chains associated with the current vulnerability Vc. Finally, in an operation 460, the function Gen( ) is called by recurrence, with the list of vulnerabilities LVul, the list of vulnerability chains LChVul thus modified, and the vulnerability to be tested Vt as current vulnerability Vc.

Once all vulnerabilities in the list LVul2 have been browsed, the function Gen( ) stops in an operation 499. At the end of the last instance of the function Gen( ) the list of vulnerability chains LChVul forms the list of vulnerability chains 20 of FIG. 1.

Once the operation 220 is completed, the list of vulnerability chains 20 generated by the analyser 6 is tested with the software environment data 18 by the validator 8 which executes a function Val( ) in an operation 230.

The function Val( ) browses the list of generated chains to determine the validity of the vulnerabilities composing these chains in the target environment 12. A vulnerability is valid if all of the characteristics of its context are included in the software configuration defined by the software environment data 18.

Following this browsing, three types of chains are identified for the target environment 12: invalid chains, valid chains stored in a list LFull 22 and partially valid chains stored in a list LPart 24.

A chain ch is valid if: $\forall vul \in ch$, $CONTEXTE(vul) \subset C$, where vul is a vulnerability of the chain ch, C is the software configuration of the target environment 12 and CONTEXT (vul) is the set of characteristics of the vulnerability context vul. A chain is invalid if: $\forall vul \in ch$, $CONTEXTE(vul) \not\subset C$. A chain is partially valid if: $\exists vul \in ch$, $CONTEXTE(vul) \subset C$.

Hence, this function allows determining, among all of the vulnerability chains potentially applicable to the target environment 12, those which can potentially be exploited given the concrete software context.

Once the lists LFull and LPart are determined, they are tested in practice in order to define exploit chains in an operation 240. For this purpose, the tester 10 accesses the database of exploits 26 and executes a function Test( ) to return the list of exploits LExp.

Each valid chain, determined in the previous operation, is exploited on the target environment 12 by successively exploiting the vulnerabilities that compose it.

This phase of exploiting a vulnerability of a valid chain is carried out by a computer code developed by an operator, or publicly available or automatically generated by a computer program.

Upon completion of the execution of a valid attack chain on the target environment 12, the result of this attack is the consequences of the last exploited vulnerability. Depending on the targeted final exploit, the operator can exploit the chain in its entirety or partially.

The partially valid chains, determined in the previous operation, can enable an operator or a computer program to calculate the risk when installing software that reduces the invalidity of the chain in a target environment 12. This enables an operator to verify that no invalid chain will become valid on the target environment 12, following the introduction of a vulnerability by modification of the configuration of this environment.

At the output, the list LExp can store four types of chains:
Valid and exploitable attack chains, i.e. all vulnerabilities associated with these chains correspond to the software context of the target environment, and can be exploited in this environment. These are attack chains with a 100% success rate;
Valid and partially exploitable chains, i.e. all vulnerabilities associated with these chains correspond to the software context of the target environment, but some vulnerabilities cannot be exploited, i.e. for these the result of the execution of the exploit is a failure. The success rate of a chain is proportional to the number of exploitable vulnerabilities;
Partially valid and exploitable chains, i.e. the vulnerabilities that correspond to the software context of the target environment can be exploited on this environment. The success rate of each chain is proportional to the number of valid vulnerabilities; and
Partially valid and partially exploitable chains, i.e. some vulnerabilities that are valid in a chain cannot be exploited. The success rate of a chain is the product between the ratios of valid vulnerabilities and exploitable vulnerabilities. For example, if a chain has five vulnerabilities, two of which are valid and only one vulnerability is exploitable amongst these two valid vulnerabilities, then its success rate is: $2/5 * 1/2$ which corresponds to a success rate of 20%.

Hence, the invention allows building attack chains, that can be entirely or partially exploited in a target environment, which allows validating known and observable vulnerabilities on the target environment, and also assessing the risk of an attack more efficiently when updating the software configuration of the target environment.

This also allows making the management of vulnerabilities in a target environment more efficient, by prioritising more finely the vulnerabilities to be corrected ("patching") present in several chains or those which reduce the attack chains, in particular the first vulnerability to be exploited in a chain.

Although the present disclosure has been described with reference to one or more examples, workers skilled in the art will recognize that changes may be made in form and detail without departing from the scope of the disclosure and/or the appended claims.

The invention claimed is:

1. A computer-implemented method for testing cybersecurity of a target environment, comprising operations including:
  a) receiving target environment data comprising software elements;
  b) accessing a database of vulnerabilities, each vulnerability being defined by a tuple associating a vulnerability identifier, a list of means defining the means used to exploit the vulnerability, and a list of consequences defining the consequences for exploiting the vulnerability, and extracting therefrom a list of vulnerabilities comprising all of the vulnerabilities comprising a vulnerability identifier associated with a software element included in the target environment data;
  c) building a list of vulnerability chains based on the list of vulnerabilities by initialising at least one pair comprising an empty list as the current list and one of the vulnerabilities from the list of vulnerabilities as the current vulnerability, and for each couple, by executing the following operations
    c)1) for each given vulnerability of the list of vulnerabilities distinct from the current vulnerability and absent from the tuples in the current list, comparing the consequences of the current vulnerability with the means of the given vulnerability, and,
    c)2) whenever a similarity between a consequence of the list of consequences of the current vulnerability with a means of the list of means of the given vulnerability is found,
      c)2)i) defining one or more new chains by adding to each of the chains of the current list whose last tuple includes the current vulnerability a tuple associating the given vulnerability, a similarity identifier, the consequence of the list of consequences of the current vulnerability, and the means of the list of means of the given vulnerability, c)2)ii) adding the new chain(s) to the list of vulnerability chains, c)2)iii) repeating the operations a) and b) with the given vulnerability as the current vulnerability, and the list of vulnerability chains as the current list.

2. The method according to claim 1, wherein the operation c) includes initializing as many pairs as there are vulnerabilities in the list of vulnerabilities.

3. The method according to claim 1, wherein the operation c)2) comprises determining a value of similarity between a consequence of the list of consequences of the current vulnerability and a means of the list of means of the given vulnerability, and determining that this value of similarity is strictly greater than a selected threshold.

4. The method according to claim 3, wherein the selected threshold is zero.

5. The method according to claim 3, wherein when the consequence of the list of consequences of the current vulnerability is identical to the means of the list of means of the given vulnerability, the similarity value is 1.

6. The method according to claim 1, wherein the target environment data further comprise software element configuration data and software element relationship data, wherein the tuple defining a vulnerability further comprises a list of context data defining the software context in which the vulnerability can be executed, the method further comprising:

d) comparing the lists of context data of the vulnerabilities of each vulnerability chain in the list of vulnerability chains with the configuration data and/or the software element relationship data, and d)1) storing in a first list the vulnerability chains whose vulnerabilities comprise lists of context data which are all contained in the configuration data and/or the software element relationship data, and d)2) storing in a second list the vulnerability chains of which only some of the vulnerabilities comprise lists of context data contained in the configuration data and/or the software element relationship data.

7. The method according to claim 6, further comprising:

e) obtaining exploits corresponding to the vulnerabilities of the vulnerability chains of the first list and of the second list, implementing the exploit chains of the first list and of the second list with these exploits, and returning the chains while classifying them according to whether they belong to the first list or the second list and according to the success rate of their implementation.

8. A non-transitory computer readable data storage medium on which a computer program is recorded, which comprises instructions that when executed by a processor of a computer system configure the computer system to implement a method for testing cybersecurity of a target environment, comprising operations including:

a) receiving target environment data comprising software elements;

b) accessing a database of vulnerabilities, each vulnerability being defined by a tuple associating a vulnerability identifier, a list of means defining the means used to exploit the vulnerability, and a list of consequences defining the consequences for exploiting the vulnerability, and extracting therefrom a list of vulnerabilities comprising all of the vulnerabilities comprising a vulnerability identifier associated with a software element included in the target environment data;

c) building a list of vulnerability chains based on the list of vulnerabilities by initialising at least one pair comprising an empty list as the current list and one of the vulnerabilities from the list of vulnerabilities as the current vulnerability, and for each couple, by executing the following operations c)1) for each given vulnerability of the list of vulnerabilities distinct from the current vulnerability and absent from the tuples in the current list, comparing the consequences of the current vulnerability with the means of the given vulnerability, and, c)2) whenever a similarity between a consequence of the list of consequences of the current vulnerability with a means of the list of means of the given vulnerability is found, c)2)i) defining one or more new chains by adding to each of the chains of the current list whose last tuple includes the current vulnerability a tuple associating the given vulnerability, a similarity identifier, the consequence of the list of consequences of the current vulnerability, and the means of the list of means of the given vulnerability, c)2)ii) adding the new chain(s) to the list of vulnerability chains, c)2)iii) repeating the operations a) and b) with the given vulnerability as the current vulnerability, and the list of vulnerability chains as the current list.

9. A computer system comprising:

a processor; and a non-transitory computer readable medium coupled to the processor and comprising instructions stored thereon instructions which when executed by the processor configure the computer system to implement a method for testing cybersecurity of a target environment, comprising operations including:

a) receiving target environment data comprising software elements;

b) accessing a database of vulnerabilities, each vulnerability being defined by a tuple associating a vulnerability identifier, a list of means defining the means used to exploit the vulnerability, and a list of consequences defining the consequences for exploiting the vulnerability, and extracting therefrom a list of vulnerabilities comprising all of the vulnerabilities comprising a vulnerability identifier associated with a software element included in the target environment data;

c) building a list of vulnerability chains based on the list of vulnerabilities by initialising at least one pair comprising an empty list as the current list and one of the vulnerabilities from the list of vulnerabilities as the current vulnerability, and for each couple, by executing the following operations c)1) for each given vulnerability of the list of vulnerabilities distinct from the current vulnerability and absent from the tuples in the current list, comparing the consequences of the current vulnerability with the means of the given vulnerability, and, c)2) whenever a similarity between a consequence of the list of consequences of the current vulnerability with a means of the list of means of the given vulnerability is found, c)2)i) defining one or more new chains by adding to each of the chains of the current list whose last tuple includes the current vulnerability a tuple associating the given vulnerability, a similarity identifier, the consequence of the list of consequences of the current vulnerability, and the means of the list of means of the given vulnerability, c)2)ii) adding the new chain(s) to the list of vulnerability chains, c)2)iii) repeating the operations a) and b) with the given vulnerability as the current vulnerability, and the list of vulnerability chains as the current list.

* * * * *